United States Patent
Caffa

[15] 3,656,520
[45] Apr. 18, 1972

[54] POWER TOOL AND AUTOMATIC FEED THEREFOR

[72] Inventor: Giorgio Caffa, Genoa, Italy
[73] Assignee: FMC Corporation, San Jose, Calif.
[22] Filed: Mar. 30, 1970
[21] Appl. No.: 23,637

[52] U.S. Cl............................144/32, 29/212, 81/57.37, 227/136
[51] Int. Cl........................................B25b 23/04
[58] Field of Search..............144/32; 227/136, 137; 29/212; 81/57, 37

[56] References Cited

UNITED STATES PATENTS

| | | | |
|---|---|---|---|
| 2,219,484 | 10/1940 | Lyon | 144/32 |
| 2,263,858 | 11/1941 | Borge | 144/32 |
| 2,951,516 | 9/1960 | Chilton | 144/32 |

Primary Examiner—Donald R. Schran
Attorney—F. W. Anderson and C. E. Tripp

[57] ABSTRACT

A pneumatic power screwdriver has a removable screw filled magazine operably mounted thereon so that screws therein retained are mechanically dislodged one at a time and pneumatically advanced to a chuck assembly forwardly of the screwdriver head. The screw magazine is rotatably driven by a ratchet wheel so that every time a screw is inserted into a work surface the magazine is rotated by an incremental amount to a position whereby an adjacently positioned screw can be advanced on the next screwing operation. The chuck assembly is mounted on the screwdriver for reciprocating movement so that when it is desired to drive a screw into a work surface, the chuck assembly can retract relative to the body of the screwdriver allowing the screwdriver head to protrude therethrough in workable engagement with the screw retained by the chuck assembly.

22 Claims, 18 Drawing Figures

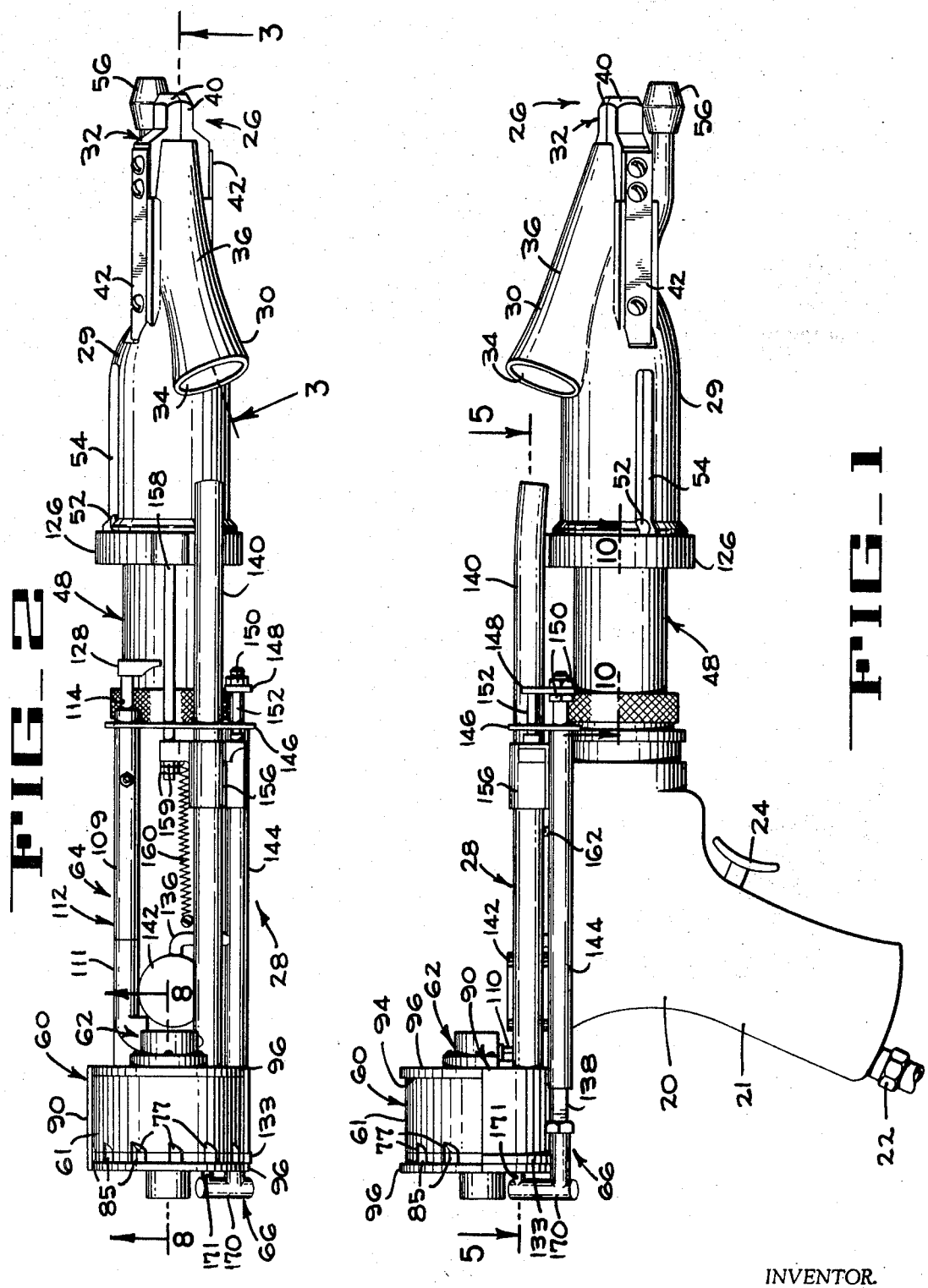

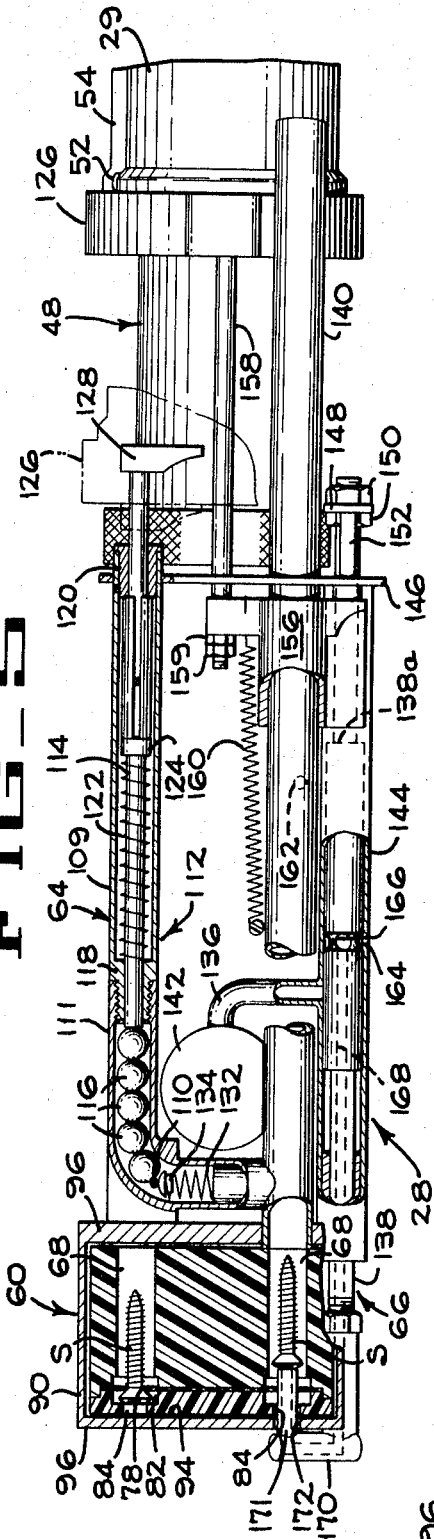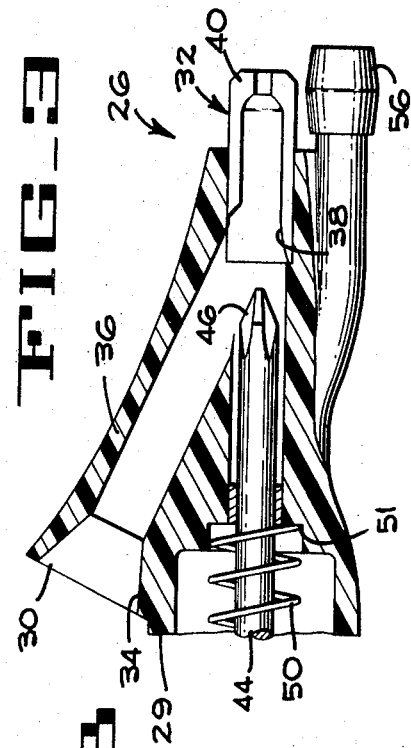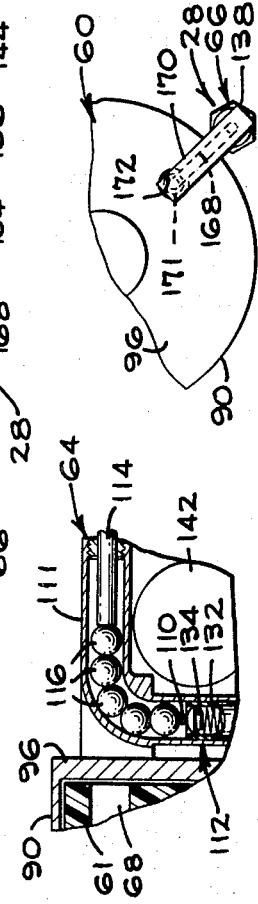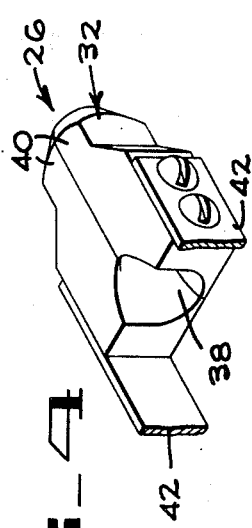

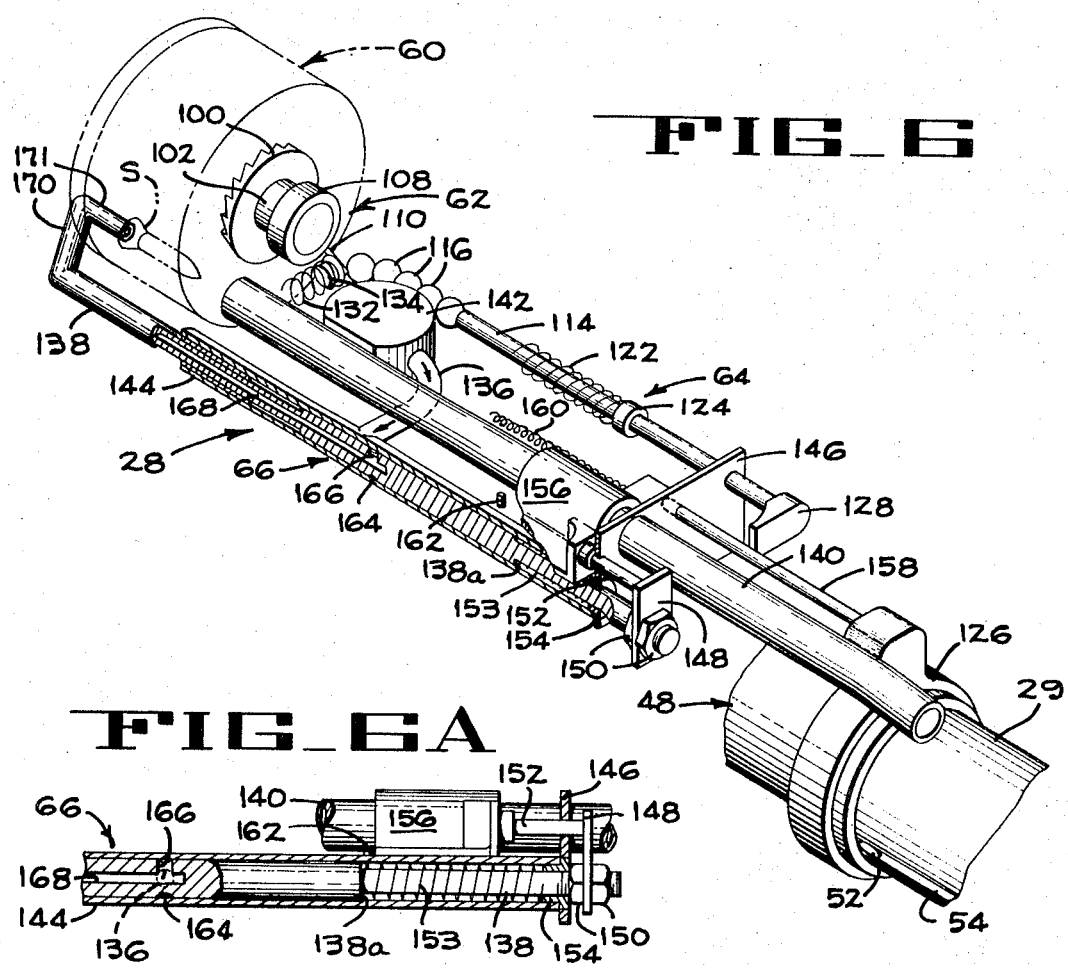
FIG_6
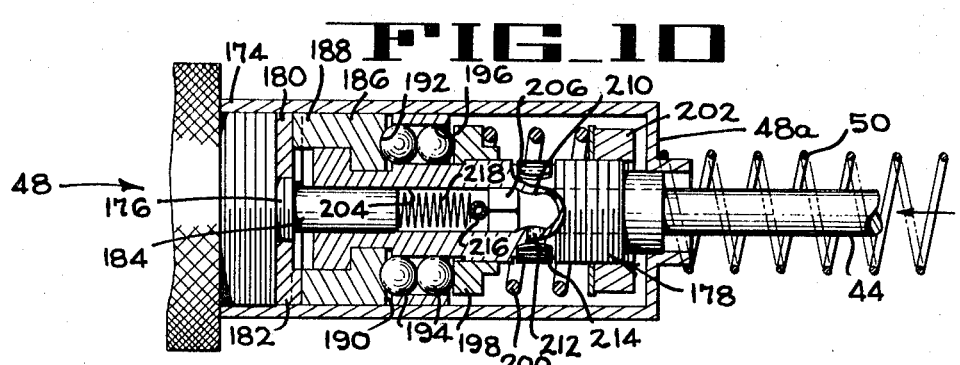
FIG_6A
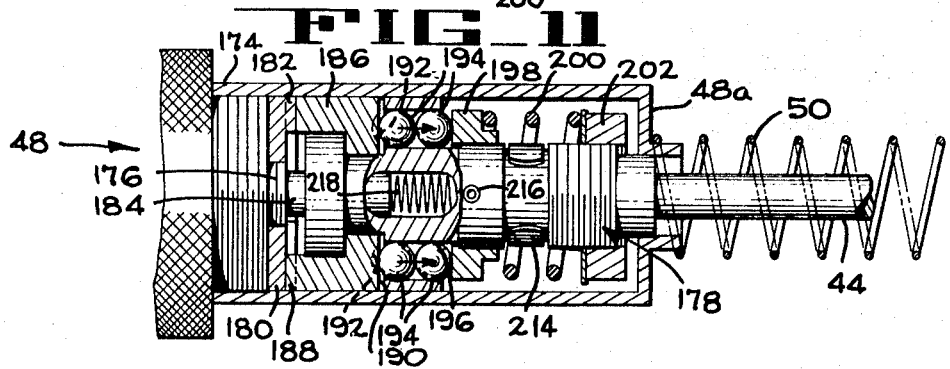
FIG_10
FIG_11

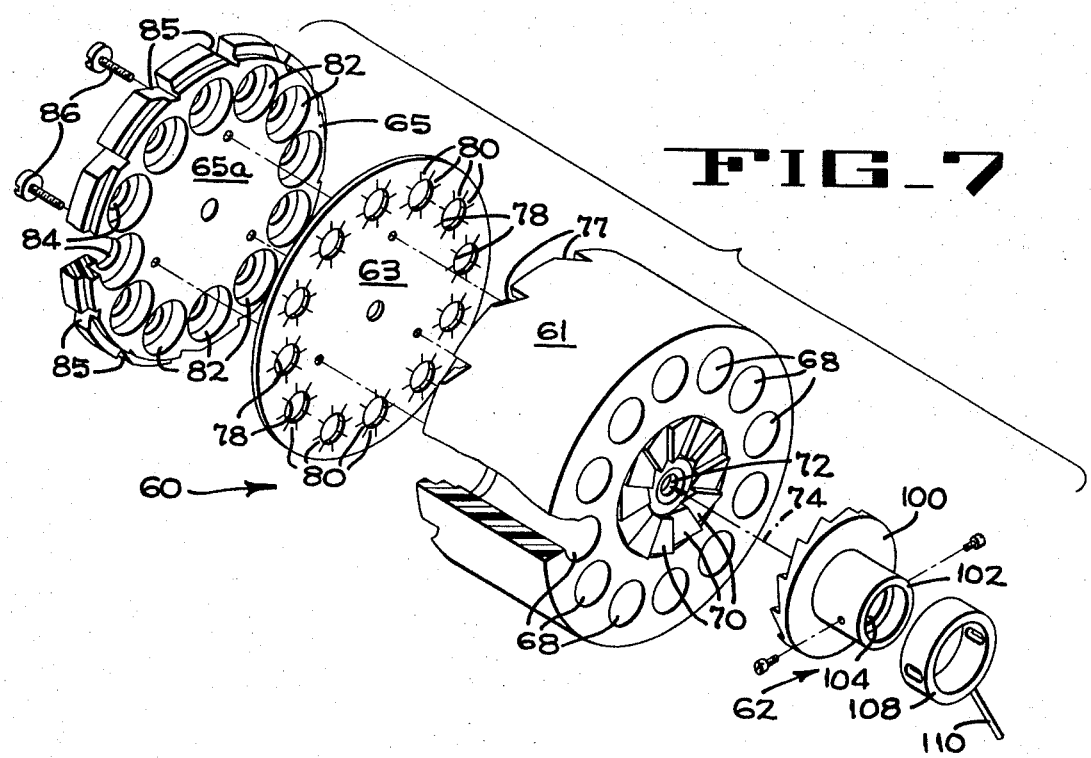
FIG_7
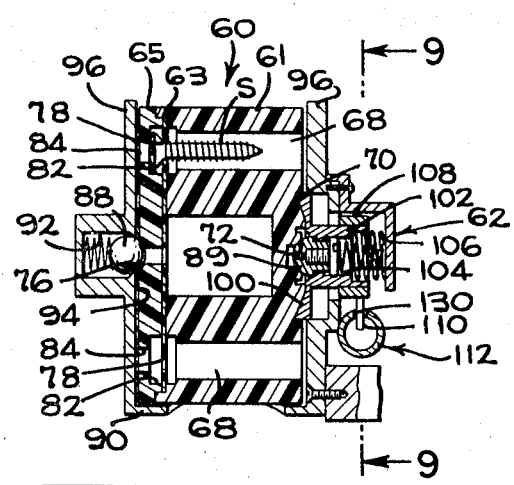
FIG_8
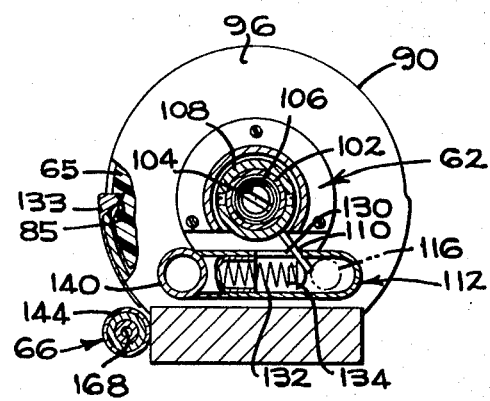
FIG_9

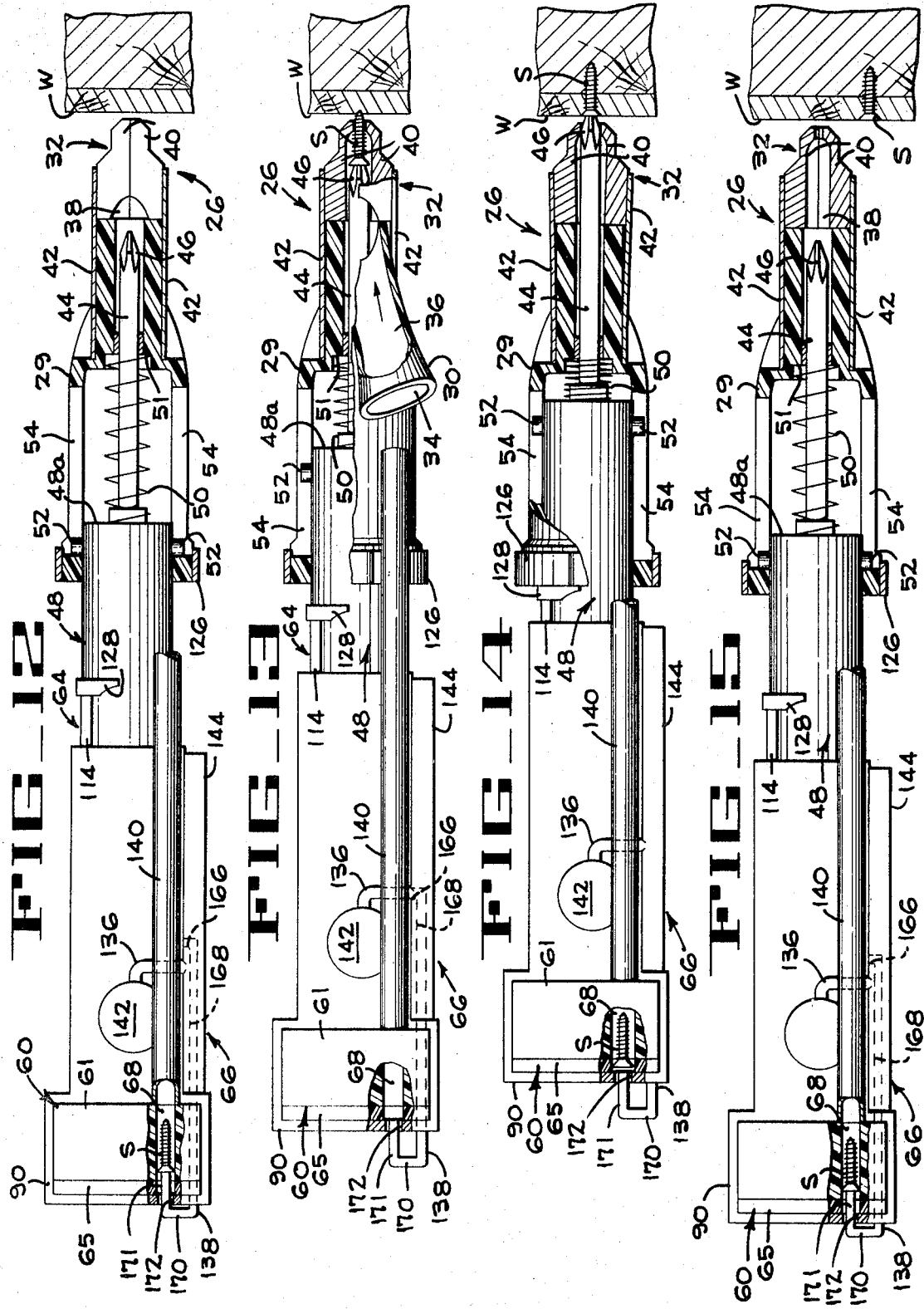

3,656,520

POWER TOOL AND AUTOMATIC FEED THEREFOR

BACKGROUND OF THE INVENTION

1. Field of the Invention

This invention pertains generally to power tools but more particularly concerns a power screwdriver of the type wherein screws are automatically fed and disposed for operative engagement with the head of the screwdriver.

2. Description of the Prior Art

Early embodiments of power screwdrivers consisted basically of a screwdriver head driven by either an electric or pneumatic motor. They had torque limiting devices to provide a preselected tightening of the screw but had no means for feeding screws to the screwdriver head and, therefore, necessitated manual feeding.

A later embodiment included a funnel shaped feed receptacle near the screwdriver head where an operator could manually drop screws, one at a time, to feed them to the screwdriver head. This system, not being automatic, led to errors and in addition was of no value when the screw had to be inserted from below into the underside of a work surface.

The most recent embodiments of power screwdrivers comprise a hand-held tool which is connected by a tube to an automatic screw feeder consisting of either a rotating or vibrating bowl wherein screws are singulated, aligned, and fed into the tube. These screwdrivers have the drawback of requiring two connecting tubes or cords, one for the screwdriver motor (either electric or pneumatic) and one for the screw feed, thus making the tool a very cumbersome apparatus to handle. In addition, the operator must control the feeder as well as the screwdriver thus detracting from the concentration normally desired in operating power tools.

SUMMARY OF THE INVENTION

The power screwdriver of the present invention was designed to overcome the disadvantages of conventional hand-held power screwdrivers and does so by incorporating an automatic screw feed device onto the housing of the screwdriver. The basic structure of the screwdriver includes a pneumatic motor driven screwdriver head and an axially reciprocal chuck assembly. The chuck assembly circumscribes the screwdriver head and has a resilient screw retaining portion which is disposed forwardly of the screwdriver head when the chuck assembly is in its normal extended position. Upon retraction of the chuck assembly relative to the screwdriver housing, the screw held thereby is moved into operable engagement with the screwdriver head which drives the screw forwardly out of the chuck assembly into a work surface.

An important component of the power screwdriver is a screw feed device which is mounted on the housing of the screwdriver and functions to automatically feed screws to the chuck assembly as they are needed for use. In a preferred form of the invention, the motor for the screwdriver is pneumatic and the screw feed device is pneumatically actuatable from the same pressurized air line as is used to drive the pneumatic screwdriver motor. It is contemplated, however, that an electric motor can be used to operate the screwdriver, and with but few mechanical alterations, the feed mechanism can be adapted to operate off the same electric motor. In either form, there would only be one power line connected to the device making it comparatively easier to manipulate than conventional automatic feed screwdrivers. It is also recognized that the feed device would not necessarily need to be used with a power screwdriver, as a power hammer or other similar power tool would equally have use for a compact and reliable feed device as described herein for feeding nails or other fasteners to the head of the power tool.

The pneumatic screw feed device includes a rotatable screw magazine which removably retains a plurality of circumferentially spaced screws. The magazine is removably mounted in the screw feed device housing and is intermittently rotatable. A screw advancing assembly mechanically dislodges one screw at a time from the screw magazine and advances the screw through a screw guide by means of a blast of compressed air. The screw guide has its foremost end aligned with a feed receptacle on the chuck assembly so that screws advanced through the guide will pass into the feed receptacle and be retained by the chuck assembly until the chuck assembly is retracted relative to the screwdriver housing allowing the screwdriver head to move into operable engagement with the screw and drive the screw forwardly out of the chuck assembly into the work surface. It is important to note that the feed device and chuck assembly are both operable in any spacial orientation so that the screwdriver is capable of driving screws from below the work surface into the underside of the work surface as well as from above or beside the work surface into the top or sides thereof respectively.

The feed device is mounted on the upper rearward portion of the screwdriver with the screwdriver head protruding forwardly through the relatively thin chuck assembly. The bulk of the power screwdriver is thus disposed on the rearward portion of the screwdriver so that the screwdriver is useful in narrow places where it is only necessary that the relatively thin forwardly protruding portion be inserted.

Accordingly, an object of the present invention is to provide a power tool having an automatic feed device as an integral part thereof.

Another object is to provide a power screwdriver with an automatic screw feed device as an integral part thereof.

Another object is to provide an automatic feed device for a power tool wherein a replaceable magazine carrying associated fasteners is utilized.

Still another object is to provide a relatively compact power tool which is easy to manipulate and which does not require a separate power and feed line to operate.

Still another object is to provide a power screwdriver with an automatic feed that is capable of functioning to drive screws from below a work surface into the underside thereof.

BRIEF DESCRIPTION OF THE DRAWINGS

FIG. 1 is a side elevation of the power screwdriver of the present invention with an automatic screw feeding mechanism as a part thereof.

FIG. 2 is a plan view of the power screwdriver of FIG. 1.

FIG. 3 is a sectional view taken substantially on line 3—3 of FIG. 2 showing the interior of the chuck assembly.

FIG. 4 is an isometric view of the forward tip of the chuck assembly.

FIG. 5 is a sectional view of the body of the screwdriver taken along line 5—5 of FIG. 1 with portions thereof being broken away for the purpose of clarity.

FIG. 5A is a fragmentary view of the ball activating means for the ratchet wheel shown in FIG. 5 but illustrated in its advanced or operative position.

FIG. 5B is a fragmentary rear elevation of the screwdriver showing a portion of the U-shaped end of the removal conduit.

FIG. 6 is a diagrammatic isometric view of the screw feed device illustrating the relationship of the component parts.

FIG. 6A is a fragmentary sectional view of a portion of the screw removal conduit with the conduit in its rearmost position.

FIG. 7 is an exploded isometric view of the screw magazine and the ratchet indexing means.

FIG. 8 is a sectional view taken on line 8—8 of FIG. 2.

FIG. 9 is a sectional view with parts broken away taken on line 9—9 of FIG. 8.

FIG. 10 is a sectional view taken on line 10—10 of FIG. 1 illustrating the torque limiting mechanism of the screwdriver during driving engagement of the screwdriver head.

FIG. 11 is a sectional view similar to FIG. 10 but showing the screwdriver assembly in a disengaged position wherein the driven member is not in driving engagement with the driving member.

FIGS. 12 to 15 are operational views showing the successive steps involved in driving a screw into a work surface with the screwdriver of the present invention.

DESCRIPTION OF THE PREFERRED EMBODIMENT

The power screwdriver of the present invention, as best seen from an overall viewpoint in FIGS. 1 and 2, comprises a pneumatic motor housing 20 which includes a handle 21 for the screwdriver, a pneumatic hose fitting 22, a trigger 24 for actuating the pneumatic motor, a retractable chuck assembly generally designated 26, and a screw feed device generally designated 28. The screw feed device retains a plurality of screws and functions to sequentially feed them one at a time to the chuck assembly from where they are driven into a work surface by a screwdriver head.

The chuck assembly 26, seen in detail in FIGS. 3 and 4, has a generally cylindrical housing portion 29 and includes a retaining head portion 32 and a screw receiving chute 30 into which screws are injected by the screw feed device. The receiving chute is seen to have a funnel shaped entry 34 and a substantially elongated tubular portion 36. The tubular portion 36 opens at its inner end into an angularly disposed retaining seat opening 38 wherein the screw rests prior to being driven into a work surface. The retaining seat 38 can be seen (FIG. 4) to be defined by two lips 40 each having a groove in one side thereof which aligns with that of the other to form the elongated internal opening of the retaining seat. The angular disposition of the retaining seat with respect to the receiving chute 30 tends to prevent screws that are resting in the retaining seat from passing back through the receiving chute even when the retaining seat is oriented in a vertical plane so that it is above the receiving chute, e.g., when a screw is to be driven into the underside of a workpiece. The lips 40 of the retaining head portion 32 are biased toward each other by a pair of leaf springs 42, each spring being affixed on one end to the chuck assembly housing 29 and on the other end to one of the lips 40 (FIGS. 1 and 2).

The chuck assembly 26 is reciprocally mounted on the forward portion of the screwdriver and circumscribes the screwdriver shank 44 and head 46, (FIG. 3), as well as a torque limiting device 48 (FIGS. 10 and 11) to be described in detail hereinafter. The chuck assembly is biased toward its extended position (FIGS. 1, 2, 12 and 15) by a compression spring 50 (FIGS. 3 and 12–15) which is positioned between an internal cavity 51 (FIG. 3) in the assembly housing 29 and the forwardly positioned face 48a of the torque limiting device 48 (FIGS. 10 and 11). The chuck assembly is prevented from rotating with the screwdriver shank by pins 52 (FIG. 1) set in the housing of the torque limiting device 48, which pins extend into radial slots 54 in the rearward portion of the chuck assembly housing. The entire chuck assembly may be manually retracted but in actual operation is retracted relative to the screwdriver housing by means of a rubber-tipped abutment head 56 (FIG. 3) which is integral with the body of the chuck assembly, and extends slightly forwardly thereof so that it is adapted to engage the work surface W (FIGS. 12 to 15) as forward driving pressure is applied to the handle 21 of the pneumatic motor housing 20. Such forward pressure will result in the screwdriver head being moved forwardly through the chuck housing (FIGS. 13 and 14) driving any screw S resting in retaining seat opening 38 through the lips 40 of the retaining head. It will be clearly seen from the operational view of FIG. 14 that the lips 40 will part when the pressure of the screw and the screwdriver head overcomes the resistive force of the leaf springs 42. A release of the forward pressure by the operator on housing 20 allows the compression spring 50 to return the chuck assembly to its normally extended position.

The screw feed device 28 (FIGS. 5 and 6) is mounted on the housing 20 and includes a screw magazine 60, ratchet means 62 for indexing the screw magazine, actuating means 64 for rotating the ratchet means, and a screw advancing assembly 66 for dislodging the screws from the magazine and feeding them to the forwardly disposed chuck assembly 26.

The screw magazine 60 is seen in detail in FIGS. 7 and 8 and comprises a relatively thick base portion 61, a thin flexible screw head supporting membrane 63, and a cap 65. The base portion 61 is a drum-shaped module having an array of circumferentially spaced tubular openings 68 passing longitudinally therethrough. Disposed radially inwardly of the openings 68 on one face of the base 61 and integral therewith is a set of circularly oriented ratchet teeth 70 which serve as the driving means for the screw magazine as will be explained in detail hereinafter. A bevel-edged circular opening 72, on the longitudinal rotational axis 74 of the magazine and in the same face of the base as the ratchet teeth 70, serves as a support surface to rotatably mount the magazine on the feed device; an identical bevel-edged circular opening 76 on the opposite face of the base serves as a support surface on the opposite end. A plurality of notches 77 are provided at one circumferential edge of the base portion to prevent reverse rotation of the magazine in a manner to be explained in detail hereinafter.

The thin flexible screw head supporting membrane 63 contains an array of circumferentially spaced openings 78 similar to and aligned with tubular openings 68 in the base but having a reduced diameter such that the head portion of a screw S (FIG. 8) will not pass therethrough but the body portion will. The flexible membrane 63 contains a plurality of radial slits around each opening 78 defining flexible tabs 80 which will flex out of the way when sufficient force is applied to the screw head thus allowing the screw head to pass therethrough. A screw extending through the membrane opening 78 will normally be supported by the flexible membrane 63 (FIG. 8), but if a substantial external force is applied to the head of the screw the resistance of the flexible tabs 80 will be overcome and the tabs will flex out of the way allowing the head of the screw to be driven out of supporting relationship with the flexible membrane.

The cap 65 of the screw magazine overlies the membrane 63 sandwiching it between its flat end face 65a and a flat end face of the base 61. The cap is provided with a circular array of counterbores 82 corresponding to each of the openings 68 and 78 in the base 61 and membrane 63 respectively. The counterbores 82 are each large enough to receive the head of a screw S and prevent such a screw from passing rearwardly out of the magazine. Concentric with each bore 82 is a smaller hole 84 extending through the cap 65 so that pressure can be applied through the hole 84 to the heads of the screws when it is desired to force them through the membrane 63 and subsequently out of the magazine. The cap of the screw magazine is provided with a plurality of notches 85 at the periphery thereof which notches are arranged to be aligned with the notches 77 of the base portion 61 of the magazine when the magazine is assembled.

The screw magazine 60 may be manually filled, or it may be automatically filled by a machine adapted for such purpose. To fill the magazine the flexible membrane 63 is placed on the base 61 so that the openings 68 and 78 of the respective members are in alignment. Screws are then placed in the aligned openings point first so that the heads of the screws are supported by the tabs 80 on the flexible membrane 63. The cap 65 is then placed over the flexible membrane so that the screw heads rest in counterbores 82. Finally, the cap is fastened to the membrane 63 and base 61 by fasteners such as bolts 86, only two of which are shown.

The screw magazine 60 is removably and rotatably mounted in a housing 90 of the feed device 28 by a ball support 88 and a rounded bolt head 89 (FIG. 8) which are spring biased into engagement with the magazine and together define a rotational axis for the magazine. The ball support shown on the left in FIG. 8 is yieldably mounted within a recess 92 formed in one of the flat end walls 96 of the housing 90 and is urged toward the magazine which is received in the cavity 94 located between the end wall of the housing. The bolt head 89 shown on the right side in FIG. 8 is also spring biased toward the magazine and disposed so as to protrude into the cavity 94. Therefore, when it is desired to insert the screw magazine 60 into the cavity 94 of the housing, it is merely pressed into the cavity from the top, as viewed in FIG. 8, until the ball 88 and the bolt head 89 snap into the detents provided by the axial openings 72 and 76 of the screw magazine. Removal of the screw magazine is just as simple since, under a lateral force, the ball and bolt head supports will be forced outwardly against their respective springs allowing the magazine to freely slide upwardly out of the cavity 94.

It is thus seen that the screw magazine can very easily and conveniently be replaced with a fully loaded one when needed. An operator can snap an empty magazine out and replace it with a full one within a matter of seconds. In addition and if he so desires, the operator can easily refill the cartridges in his leisure time by merely removing the cap 65 and inserting the required screws into the base 61.

The ratchet means 62 for indexing the screw magazine is most clearly seen in FIG. 7 and comprises a toothed ratchet wheel 100 having a cylindrical extension 102 of reduced diameter extending from the front face thereof. The ratchet wheel is rotatably mounted in one of the end walls 96 of housing 90 and circumscribes the bolt head 89 which is slidably received within an axial opening 104 extending through the ratchet wheel. The ratchet wheel is biased by an abutting compression spring 106 which forces the teeth of the ratchet wheel to protrude into cavity 94 and into operational engagement with the teeth 70 on the screw magazine when the screw magazine is inserted in the housing. A collar 108 having a radially extending trigger finger 110 is set onto the extension 102 of the ratchet wheel so that rotation of the finger 110 causes the entire ratchet wheel to rotate correspondingly.

The actuating means 64, best seen in FIGS. 5, 5A and 6, is operatively connected with the ratchet means 62 to intermittently rotate the ratchet wheel 100 and comprises primarily a pair of conduits 109 and 111 which are threaded together to form an L-shaped tubular conduit 112 with a movable plunger 114 and a plurality of balls 116 disposed axially therewithin. The plunger is disposed within conduit 112 for reciprocal linear movement being guided at its inward end by a guide block 118 integral with the conduit 112, and at its outer end by a guide block 120 fixed to the conduit 112. A return compression spring 122 circumscribes the plunger. One end of the spring is in engagement with a radially extending abutment 124 on the plunger 114 and the other end is abutted against the guide block 118 so that any inward movement of the plunger will compress the spring.

A collar 126 fixed on the rearward end of the chuck assembly 26 is disposed so as to contact an abutment head 128 on the outer end of plunger 114 when the chuck assembly is retracted in the manner discussed hereinbefore. As shown in phantom lines in FIG. 5, rearward movement, or retraction, of the chuck assembly will force the plunger 114 inwardly compressing the return spring 122 and allowing the inner end of the plunger to extend a preselected distance through guide block 118 to a position as shown in FIG. 5A.

The balls 116 rest in abutting engagement with the plunger 114 in the conduit 112 and are located inwardly of the guide block 118 so that when the plunger is forced through the guide block it will move the balls a corresponding distance within the conduit causing them to be moved around the corner of the conduit (FIG. 5A). The innermost one of the balls 116 is in continuous engagement with the finger 110 of the ratchet means which finger protrudes through a slot 130 (FIGS. 8 and 9) in the top of conduit 112. Movement of the balls 116 by the inward movement of plunger 114 causes the finger 110 to rotate in a clockwise direction (as viewed in FIG. 9) thus rotating the ratchet wheel 100 to which it is connected correspondingly. When the chuck assembly is extended as between screwing operations, the return spring 122 returns the plunger 114 to its normal position (FIG. 5) and a second compression spring 132 with a finger contacting head 134, which is disposed within conduit 112 on the opposite side of finger 110 from the balls 116, forces the finger 110 and balls 116 back to their normal position.

As the finger 110 of the ratchet means returns to its normal position, it causes the ratchet wheel 100 to rotate in a counterclockwise direction as viewed in FIGS. 7 and 9. The compressibility of spring 106, which normally biases the ratchet wheel into engagement with teeth 70 of the screw magazine, allows the ratchet wheel to retract and slide over teeth 70 during this counterclockwise rotation. A pawl 133 (FIGS. 1 and 9) is mounted on the side of the magazine housing 90 with its head in operative engagement with the aligned notches 85 and 77 on the outer cylindrical surface of the screw magazine to prevent the screw magazine from rotating in a counterclockwise direction. It is, therefore, apparent that clockwise rotation of the ratchet wheel will cause the screw magazine to be rotated clockwise, but counterclockwise rotation of the ratchet wheel does not rotate the screw magazine as it is held motionless by the pawl 133. The amount of rotary movement imparted to the ratchet wheel by the movement of the finger 110 in the conduit 112 every time the chuck assembly is retracted will be such that the screw magazine will be indexed in the clockwise direction by an angular amount corresponding to the angular distance between a pair of adjacent screws in the openings 68.

The screw advancing assembly 66 functions to remove screws from the magazine 60 and advance them pneumatically to the chuck assembly 26. The advancing assembly, best seen in FIGS. 5 and 6, includes a pressurized air conduit 136, a reciprocating substantially J-shaped ejector member 138, and a screw guide tube 140. The pressurized air conduit 136 has one end in fluid communication with a generally cylindrical pressurized head 142 which is, in turn, in fluid communication with the pressurized air line used to drive the pneumatic screwdriver motor. The opposite end of conduit 136 is connected to the midportion of an elongated sleeve 144 which has a snug fit around the ejector member 138 while allowing the ejector member to slide axially therewithin. The forward portion of ejector member 138 is of reduced diameter and slidably fits through a guide wall 146 which is rigid with respect to the housing 20 of the pneumatic motor. A radially extending flange 148 is secured to the forward reduced end of ejector member 138 by a pair of lock nuts 150 and has an abutment rod 152 integral therewith projecting from its outer end in a rearward direction through the guide wall 146. Surrounding the reduced portion of the ejector member 138 and within the sleeve 144 is a compression spring 153 (FIG. 6A) which abuts at one end against an annular shoulder 138a defined by the forward end of the enlarged portion of the ejector member. The other end of spring 153 abuts against a collar plug 154 surrounding the reduced portion of the ejector member which plug is tightly fitted into the opening in wall 146 through which the ejector member passes. The compression spring 153 thus urges the ejector member to slide axially within sleeve 144 in a rearward direction.

To move the ejector member within sleeve 144 in a forward direction, a slide block 156, which is slidably fitted around screw guide tube 140, is disposed for engagement with the abutment rod 152. The block 156 is linked to the collar 126 on the chuck assembly by a tie rod 158 on which the block is slidably mounted. Thus forward movement of the chuck assembly pulls forwardly the block 156 which abuts against nuts 159 secured on the end of the tie rod. This forward movement of the slide block 156 forces the ejector member 138 to slide forwardly within sleeve 144 as the slide block engages the abutment rod 152 thereby compressing the spring 153. It should be noted that spring 50 within the chuck assembly is stronger than spring 153 so that spring 153 will not draw the chuck assembly rearwardly without manual assistance. A coil spring 160 is provided to draw the block 156 rearwardly when the chuck assembly is moved rearwardly a slight distance thus allowing compression spring 153 to also simultaneously push ejector member 138 rearwardly a corresponding distance. A fixed stop 162 is provided on the upper face of the motor housing 20 to limit rearward movement of the slide block 156; however, it should be understood that even though the block 156 is limited in its rearward movement by the stop 162 this does not limit rearward movement of the chuck assembly because the tie rod 158 extending between the block 156 and the chuck assembly is free to slide rearwardly through the block 156.

As best seen in FIG. 5 and 6A, the ejector member 138 has an annular groove 164 cut in the center portion thereof. A radial opening 166 connects the groove 164 to an axial passageway 168 (FIGS. 5, 6 and 6A) that passes rearwardly through the ejector member 138 and through a U-shaped extension 170 that constitutes the rearward end of the ejector member. A leg 171 of the U-shaped extension 170, through which the terminus of the passageway 168 passes, projects into an opening 172 (FIGS. 5 and 5B) in the rear wall 96 of the magazine housing 90. The opening 172 is situated so that it will be aligned with each of the successive openings 84 in the cap 65 of the screw magazine 60 as the magazine is rotatably indexed within the housing 90.

The ejector member 138 is movable between a forward position depicted in FIGS. 5 and 6, and a rearward position depicted in FIG. 6A. In its rearward position, the annular groove 164 aligns with the pressurized conduit 136, thereby placing the conduit 136 in fluid communication with the groove 164, and, consequently, in fluid communication with the radial opening 166 and the axial passageway 168. Therefore, when the ejector member 138 is in its rearward position, a continuous blast of air will flow from the pressurized head 142 to the terminus of the passageway 168. When the ejector member 138 is moved from its rearward position to its forward position, the groove 164 is moved out of fluid communication with conduit 136 cutting off the blast of air. Such forward movement also causes leg 171 of the U-shaped extension to slide into opening 172 and subsequently into aligned openings 84, 78, and 68 of the screw magazine thus forcing a screw retained in the aligned openings out of its retained position. In other words, leg 171 of the U-shaped extension functions to mechanically dislodge a screw from the supporting membrane 63 in the screw magazine so that it lies loose in the associated elongated opening 68 on the base 61 of the screw magazine. It is apparent then that when the ejector member 138 is next moved to its rearward position, whereby a blast of air is directed through passageway 168, the dislodged screw will be blown by the blast of air emanating from leg 171 through screw guide tube 140 which is aligned with leg 171 and, consequently, with the dislodged screw in the magazine. It should be noted here that if the screwdriver is oriented in a vertical position with the chuck assembly below the motor housing, the dislodged screw lying in opening 68 will fall due to gravity through screw guide tube 140 and into the chuck assembly without the assistance of a blast of air. In any other position the blast of air is needed to advance the screw to the chuck assembly. It can be seen from FIGS. 1 and 2, that the forward end of screw guide tube 140 is in alignment with the receiving chute 30 of the chuck assembly so that any screw passing through screw guide 140 will pass into the receiving chute and thus be retained by the chuck assembly in a position to be driven into the work surface as discussed hereinbefore.

A torque limiting device 48 mentioned hereinbefore, is located at the forward end of the screwdriver within the slidable chuck assembly housing and is provided to prevent the screwdriver from imparting too great a torque to the screw head thus possibly shearing the head off the screw. As seen in detail in FIGS. 10 and 11, the torque, limiting device includes a cylindrical housing 174, a driving member 176 operatively connected to the pneumatic motor for continuous rotation when the motor is energized and a driven member 178. The driving member has a plate 180 at its forward end which is rigid therewith and which includes a plurality of circumferentially spaced radially extending dogs 182 and a projecting pilot 184 which is insertable in and serves as a supporting guide for one end of the driven member 178. A clutch ring 186 adjacent the driving member 176 and rotatably mounted about the driven member also has a plurality of dogs 188 which cooperate, during the screwdriving operation, with the dogs 182 on the driving member. The forward annular face 190 of the clutch ring 186 has a plurality of detents 192 defining force imparting surfaces in which a plurality of balls 194 can be retained. Two layers of such balls 194 are seen to lie in a plurality of circumferentially spaced cylindrical passages 196 in the driven member 178. The balls are held in the passages 196 on one end by face 190 of the clutch ring 186 and on the other end by an abutment washer 198 which is slidably mounted upon the outer cylindrical surface of the driven member 178 and which is biased against the balls by a coil spring 200 resting on a seat 202 threaded onto the driven member. Thus, it is seen that coil spring 200 presses the balls 194 into the detents 192 with a force dependent on the compression of spring 200 which compression is adjustable through threaded seat 202.

The driven member 178 has an internal chamber 204 having one end rotatably fitted over pilot 184 while the other end is adapted to matingly receive the square inner end 206 of the screwdriver shank 44. The square interfitting between the driven member and the screwdriver shank prevents relative rotation of the two members. Forwardly of the square inner end 206 of the screwdriver shank is an annular notch 210 into which a pin 212 of a spring clip 214 fits to removingly secure the screwdriver shank in the driven member.

A cross bar 216 passes through the central region of the driven member 178 and serves as an abutment for a compression spring 218 whose opposite end abuts against the forward end of pilot 184. The compression spring 218 urges the driven member as well as the clutch ring 186 in a forward direction disengaging the dogs on the plate 180 and the clutch ring respectively and holds them in this position until an inward force is applied to the screwdriver shank to compress the spring 218 and move the respective dogs into operative engagement.

Therefore, when the screwdriver shank is moved into engagement with a screw and forward pressure is applied to the screw, the dogs 182 and 188 are moved into engagement and if the pneumatic motor is turned on, as by trigger 24, the driving member will impart rotary motion to the screwdriver shank through the clutch ring 186, the balls 194, and the driven member 178. When the torque exerted on shank 208 by the screw being driven in the work surface reaches a preselected level as determined by the compressive force of spring 200, the balls 194 will pop out of detents 192 compressing spring 200 and allowing the driving and driven members to rotate relative to each other. In this manner the shank is prevented from rotating with the driving member and the heads of the screws are prevented from being sheared.

Reference to FIGS. 12 to 15 will facilitate an understanding of the overall operation of the power screwdriver. In FIG. 12 the chuck assembly 26 is seen fully extended with leg 171 of the J-shaped ejector member 138 protruding into the screw magazine 60 when it has just dislodged a screw S. As pointed out hereinbefore, if the screwdriver is oriented in a vertical position with the chuck assembly disposed below the motor housing, the dislodged screw S will slide through the screw guide tube 140 and pass into the chuck assembly. When forward pressure is applied to the screwdriver handle 21, FIG. 13, the chuck assembly is forced rearwardly relative to the motor housing 20 because of the resistance of the work surface W in contact with abutment head 56 on the chuck assembly. A slight relative rearward movement of the chuck assembly will cause annular groove 164 and the radial opening 166 in the ejector member to align with pressurized conduit 136 thus allowing a blast of compressed air to pass through the ejector member and blow the dislodged screw S through the screw guide 140 into the chuck assembly if it is still in the screw magazine. The screw passes very rapidly to the chuck assembly and is thus resting in the retaining seat opening 38 when the screwdriver head enters the opening. Continued forward pressure on the screwdriver handle 21 moves the screwdriver head into engagement with the screw and forces the screw between lips 40 of the retaining head portion 32 of the chuck assembly. When the screw contacts the work surface, the rearward pressure on the screwdriver shank 44 engages the dogs 182 and 188 in the torque limiting device causing the screwdriver head to rotate, assuming the trigger 24 has been pulled, thus driving the screw S into the work surface (FIG. 14). It should also be noted that the relative rearward movement of the chuck assembly during the screwdriving operation, indexes the screw magazine 60 bringing another screw into alignment with leg 171 of the ejector member. As the screwdriver is moved rearwardly away from the work surface, compression spring 50 in the chuck assembly forces the chuck assembly back to its extended position (FIG. 15) thus drawing leg 171 into the screw magazine and dislodging the screw that was previously moved into alignment therewith. The screwdriver is then in position for a second identical operation.

From the foregoing description it is seen that the hand manipulated power screwdriver of the present invention is characterized by an automatic screw feed device that is integral with the screwdriver and which includes a readily replaceable magazine or cartridge which is preloaded prior to use. It is readily apparent that such a device is easy to manipulate and is useful even when driving screws from below a work surface into the underside thereof.

Although the best mode contemplated for carrying out the present invention has been herein shown and described, it will be apparent that modification and variation may be made without departing from what is regarded to be the subject matter of the invention.

I claim:

1. A feed device for a portable power tool of the type which can be hand carried by an operator to a work surface and which has a head for driving fasteners into a work surface comprising in combination, a fastener magazine having a plurality of fasteners lodged therein, means for rotatably mounting said magazine on said power tool, means for alternately rotating said magazine and holding said magazine in one of a plurality of selected angular positions, means for dislodging a fastener from said magazine while said magazine is held in each selected angular position, pneumatic means for advancing said dislodged fasteners from said magazine to a position proximate the head of the power tool, and means for retaining said fasteners proximate said head so as to allow the head to drive the fastener into a work surface.

2. The apparatus of claim 1 wherein said power tool is a power screwdriver.

3. The apparatus of claim 2 wherein said means for alternately rotating said magazine and holding said magazine in a selected angular position includes ratchet means.

4. The apparatus of claim 2 wherein said fastener magazine includes a circular array of openings each designed to retain a screw therein until said screws are dislodged by said means for dislodging a fastener.

5. The apparatus of claim 4 wherein said means for dislodging a fastener includes a reciprocating finger for sequentially projecting into and retracting out of said openings in said magazine when said magazine is positioned in any one of its angular positions.

6. The apparatus of claim 5 wherein said reciprocating finger has an aperture therein through which compressed air can be blown to advance said screws from said magazine, and a guiding conduit for delivering said screws from said magazine to the head of said power screwdriver.

7. The apparatus of claim 6 wherein said means for retaining fasteners proximate said head includes a chuck assembly which holds individually advanced screws in a position whereby said screws can be contacted by said head of said screwdriver and driven into said work surface.

8. In a portable power tool of the type having a gripping handle for hand operation, a chuck assembly for holding a fastener in a properly oriented position to be driven into a work surface, and a driving head movable relatively to the chuck assembly for driving said fastener therefrom and into said work surface, the improvement comprising a magazine removably mounted upon said tool for axial rotation in a position out of the path of said driving head wherein it can be readily removed and replaced, said magazine having a plurality of spaced pockets annularly arranged about the rotary axis of said magazine with each pocket being adapted to receive a single fastener, means operative in conjunction with the relative movement of said driving head and said chuck assembly during the fastener driving operation for indexing said magazine an angular amount equal to the angular spacing of said pockets, means operative in conjunction with the relative movement of said driving head and said chuck assembly for dislodging a fastener from one of the pockets in said magazine, and means for delivering said dislodged fastener to said chuck assembly irrespective of the particular spatial orientation of said power tool.

9. In a portable power tool as set forth in claim 8 wherein said fasteners comprise screws and said driving head is provided with means for engaging said screws for joint rotary movement.

10. In a portable power tool as set forth in claim 8 wherein said means for indexing said magazine comprises a ratchet wheel.

11. In a portable power tool as set forth in claim 8 wherein said means for dislodging a fastener from one of the pockets in said magazine comprises a finger which is operatively connected to said chuck assembly so as to move rearwardly relative to said driving head when said chuck assembly moves rearwardly relative to said driving head and so as to move forwardly relatively to said driving head to dislodge the fastener when said chuck assembly moves forwardly relative to said driving head upon the completion of the fastener driving operation.

12. The feed device of claim 11 wherein said magazine includes a base element, a plurality of spaced passages extending through said base element in which passages said fasteners will slidably fit, and a flexible membrane overlying said base element having openings extending therethrough aligned with said passages of said base element but of reduced diameter so that an enlarged portion of a fastener will be restrained by said membrane from passing through said openings until said fastener is subjected to the force of said finger to overcome the restraining resistance of said membrane.

13. In a portable power tool as set forth in claim 8 wherein said means for delivering the dislodged fastener to the chuck assembly includes an elongated conduit.

14. In a portable power tool as set forth in claim 13 wherein said means for delivering the dislodged fastener to the chuck assembly further includes pneumatic means for advancing the fastener along said elongated conduit.

15. In a portable power tool as set forth in claim 14 including a feed receptacle connected to said chuck assembly and having a guiding conduit therethrough for guiding the dislodged fasteners to said properly oriented position in said chuck assembly, said elongated conduit being rigid and being movable relative to said feed receptacle, and said feed receptacle having a funnel shaped entry portion for receiving said dislodged fasteners as they are ejected from said elongated conduit.

16. In a portable power screwdriver of the type having a gripping handle for hand operation, a chuck assembly for holding a screw in properly oriented position to be driven into a work surface, and a power driven screwdriver head mounted for longitudinal movement relative to said chuck assembly for driving said screw therefrom and into said work surface, the improvement comprising a magazine removably mounted upon said tool in a position out of the path of said screwdriver head wherein it can be readily removed and replaced, said magazine having a plurality of separate pockets arranged in spaced locations on said magazine with each pocket being adapted to receive a single screw, means operative in conjunction with the relative movement of said screw driver head and said chuck assembly during the screwdriving operation for shifting the position of said magazine on said tool by an amount equal to the spacing between said pockets, means operative in conjunction with the relative movement of said screwdriver head and said chuck assembly for dislodging a screw from one of the pockets in said magazine, and means for delivering said dislodged screw to said chuck assembly irrespective of the particular spatial orientation of said power tool.

17. In a portable power screwdriver as set forth in claim 16 wherein said means for shifting the position of said magazine comprises a ratchet.

18. In a portable power screwdriver as set forth in claim 16 wherein said means for dislodging a screw from one of the pockets in said magazine comprises a finger which is operatively connected to said chuck assembly so as to move into said magazine to dislodge said screw when said chuck assembly moves forwardly relative to said screwdriver head upon the completion of the screwdriving operation.

19. In a portable power screwdriver as set forth in claim 18 wherein said means for delivering the dislodged screw to the chuck assembly includes an elongated conduit.

20. In a portable power screwdriver as set forth in claim 19 wherein said means for delivering the dislodged screw to the chuck assembly further includes pneumatic means for advancing the screw along said elongated conduit, said elongated conduit being of rigid construction.

21. In a portable power screwdriver as set forth in claim 20 wherein said elongated conduit is movable longitudinally relative to said chuck assembly, and means connected to said chuck assembly for receiving each screw ejected from said elongated conduit and guiding it to said properly oriented position in said chuck assembly.

22. In a portable power screwdriver as set forth in claim 21 wherein said means connected to the chuck assembly for receiving and guiding each screw comprises a short chute having a funnel shaped entry portion generally facing the forward end of said elongated conduit, the longitudinal axis of said chute forming an acute angle with the longitudinal axis of said chuck assembly and said screwdriver head.

* * * * *